United States Patent
Conn

(10) Patent No.: US 11,220,902 B2
(45) Date of Patent: Jan. 11, 2022

(54) PREDICTING A TELEMETRY MODE OF A DOWNHOLE TOOL

(71) Applicant: Schlumberger Technology Corporation, Sugar Land, TX (US)

(72) Inventor: David Conn, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 101 days.

(21) Appl. No.: 16/655,192

(22) Filed: Oct. 16, 2019

(65) Prior Publication Data
US 2021/0115787 A1 Apr. 22, 2021

(51) Int. Cl.
*E21B 47/14* (2006.01)
*H04Q 9/02* (2006.01)
*G01H 3/04* (2006.01)
*E21B 49/00* (2006.01)

(52) U.S. Cl.
CPC .............. *E21B 47/14* (2013.01); *G01H 3/04* (2013.01); *H04Q 9/02* (2013.01); *E21B 49/00* (2013.01)

(58) Field of Classification Search
CPC ........... E21B 47/14; E21B 49/00; G01H 3/04; H04Q 9/02
See application file for complete search history.

(56) References Cited

U.S. PATENT DOCUMENTS

| | | | |
|---|---|---|---|
| 2007/0052551 A1 | 3/2007 | Lovell et al. | |
| 2014/0240140 A1* | 8/2014 | Switzer | E21B 47/12 340/854.6 |
| 2014/0240141 A1* | 8/2014 | Logan | E21B 47/18 340/854.6 |
| 2015/0275659 A1* | 10/2015 | Jarrot | G06F 3/04842 367/81 |
| 2016/0003034 A1* | 1/2016 | Liu | H04L 27/02 340/853.2 |
| 2016/0003035 A1* | 1/2016 | Logan | E21B 47/00 340/854.6 |
| 2017/0159426 A1 | 6/2017 | Logan et al. | |
| 2018/0003041 A1 | 1/2018 | Roberson | |
| 2018/0003044 A1 | 1/2018 | Kusuma | |
| 2019/0052374 A1 | 2/2019 | Lie et al. | |
| 2020/0241166 A1* | 7/2020 | Marsh | E21B 49/00 |

OTHER PUBLICATIONS

International Search Report and Written Opinion of counterpart International Patent Application No. PCT/US2020/055527 dated Jan. 27, 2021, 12 pages.

* cited by examiner

*Primary Examiner* — Ojiako K Nwugo
(74) *Attorney, Agent, or Firm* — Alec J. McGinn

(57) ABSTRACT

A method for predicting a telemetry mode of a downhole tool includes receiving a signal from the downhole tool at a computing system at a surface. The method also includes predicting the telemetry mode of the downhole tool based on the signal. The method also includes switching a telemetry mode of the computing system to match the telemetry mode of the downhole tool. The method also includes demodulating the signal using the computing system after the telemetry mode of the computing system has been switched.

22 Claims, 8 Drawing Sheets

PREDICTING A TELEMETRY MODE OF A DOWNHOLE TOOL

BACKGROUND

A downhole tool may be run into a wellbore that is formed in a subterranean formation. The downhole tool may include a measurement-while-drilling (MWD) tool, a logging-while-drilling (LWD) tool, or both that is/are configured to obtain downhole measurements. The downhole tool may communicate with a computing system at the surface via telemetry. For example, the downhole tool may transmit the measurements to the surface using mud pulse telemetry or electromagnetic (EM) telemetry.

The downhole tool may have a plurality of telemetry modes to transmit the measurements to the surface. In an example where the downhole tool communicates using mud pulse telemetry, each mode may correspond to a different duration of the pressure pulses transmitted by the downhole tool. For example, the pressure pulses may have a duration of 0.5 seconds in a first mode, a duration of 0.6 seconds in a second mode, a duration of 0.8 seconds in a third mode, etc. The downhole tool may be set to one of these modes, and the computing system at the surface may be set to the same mode to enable communication therebetween. However, the downhole tool may inadvertently change modes to differ from the mode of the computing system. For example, the downhole tool may inadvertently change modes in response to vibration, which may occur while traveling to the wellsite, while being tripped into the wellbore, or the like. When the mode of the downhole tool differs from the mode of the computing system at the surface, it may be difficult for the computing system to decode the pulses.

SUMMARY

A method for predicting a telemetry mode of a downhole tool is disclosed. The method includes receiving a signal from the downhole tool at a computing system at a surface. The method also includes predicting the telemetry mode of the downhole tool based on the signal. The method also includes switching a telemetry mode of the computing system to match the telemetry mode of the downhole tool. The method also includes demodulating the signal using the computing system after the telemetry mode of the computing system has been switched.

In another embodiment, the method includes receiving a signal from the downhole tool at a computing system at a surface. The signal includes encoded measurement data captured by a measurement-while-drilling tool in the downhole tool, a logging-while-drilling tool in the downhole tool, or both. The telemetry mode of the downhole tool is unknown at a time that the signal is received. The method also includes identifying a first frequency band of the signal. The first frequency band of the signal includes the encoded measurement data. The method also includes applying a low-pass filter to the signal with a predetermined cutoff at a predetermined frequency to remove one or more second frequency bands of the signal that are outside of the first frequency band when a modulation type of the signal comprises pulse position modulation. The method also includes comparing the first frequency band of the signal to a library of signals. The signals in the library have known telemetry modes. The method also includes predicting the telemetry mode of the downhole tool based upon the comparison. The method also includes switching a telemetry mode of the computing system to match the telemetry mode of the downhole tool. The method also includes demodulating the signal using the computing system after the telemetry mode of the computing system has been switched.

A system is also disclosed. The system includes a downhole tool configured to run into a wellbore, capture measurement data while positioned within the wellbore, encode the measurement data while positioned within the wellbore, and transmit a signal including the encoded measurement data while positioned within the wellbore. The system also includes a computing system positioned at a surface. The computing system is configured to perform operations. The operations include receiving the signal. A telemetry mode of the downhole tool is unknown by the computing system at a time that the signal is received. The operations also include identifying a first frequency band of the signal. The first frequency band of the signal includes the encoded measurement data. The operations also include applying a low-pass filter to the signal with a predetermined cutoff at a predetermined frequency to remove one or more second frequency bands of the signal that are outside of the first frequency band when a modulation type of the signal comprises pulse position modulation. The operations also include comparing the first frequency band of the signal to a library of signals. The signals in the library have known telemetry modes. The operations also include predicting the telemetry mode of the downhole tool based upon the comparison. The operations also include switching a telemetry mode of the computing system to match the telemetry mode of the downhole tool. The operations also include demodulating the signal after the telemetry mode of the computing system has been switched.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 4A illustrates a graph of pressure versus time for a signal having a pulse length of 0.6 seconds. FIG. 4B illustrates a graph of pressure versus time for a signal having a pulse length of 0.8 seconds. FIG. 4C illustrates a graph of pressure versus time for a signal having a pulse length of 1.0 seconds. FIG. 4D illustrates a graph of pressure versus time for a signal having a pulse length of 1.5 seconds.

FIG. 5A illustrates a graph of the signal in FIG. 4A (having a pulse length of 0.6 seconds) after being processed. FIG. 5B illustrates a graph of the signal in FIG. 4B (having a pulse length of 0.8 seconds) after being processed. FIG. 5C illustrates a graph of the signal in FIG. 4C (having a pulse length of 1.0 seconds) after being processed. FIG. 5D illustrates a graph 540 of the signal in FIG. 4D (having a pulse length of 1.5 seconds) after being processed.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
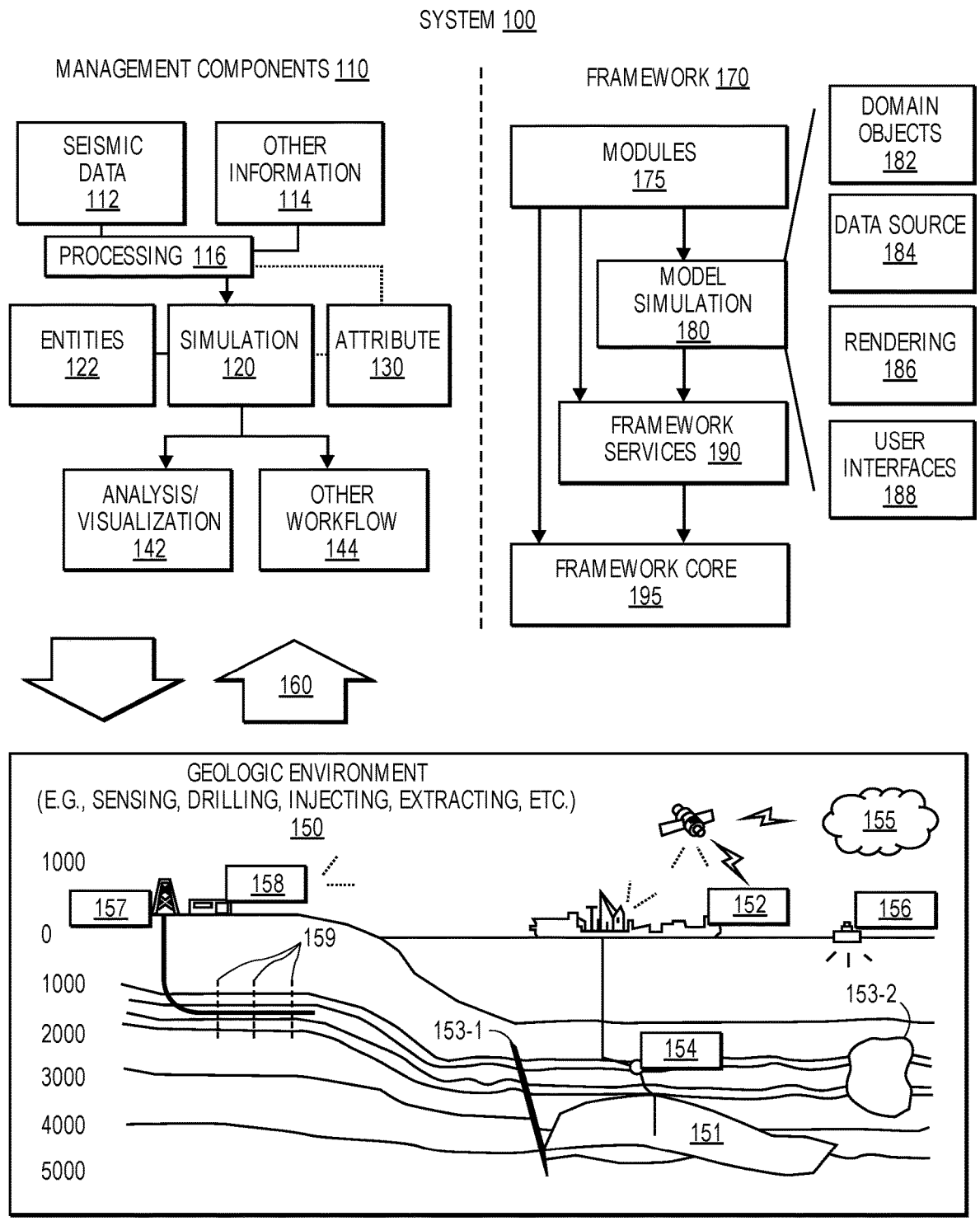
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 160 that includes a model simulation layer 180 along with a framework services layer 190, a framework core layer 195 and a modules layer 175. The framework 160 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
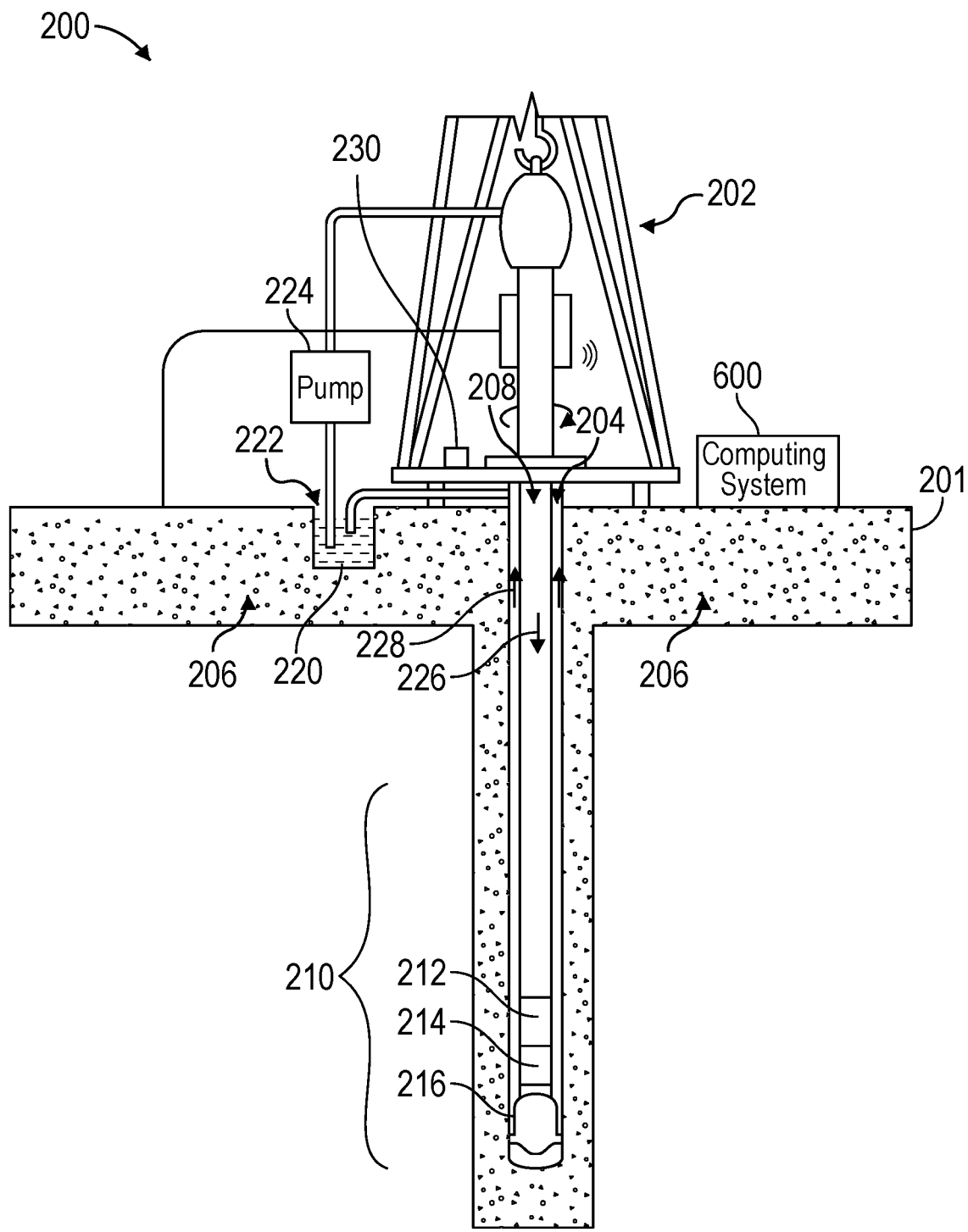
FIG. 2 illustrates a cross-sectional view of a wellsite including a downhole tool in a wellbore, according to an embodiment.

FIG. 2 illustrates a cross-sectional view of an example of a wellsite 200, according to an embodiment. The wellsite 200 may include a rig 202, which may include a rig sub-structure and a derrick assembly. The rig 202 may be positioned over a wellbore 204 that is formed in a subterranean formation 206. A drill string 208 may be supported by the rig 202 and extend down into the wellbore 204.

A downhole tool (e.g., a bottom-hole assembly) 210 may be coupled to a lower end of the drill string 208. The downhole tool 210 may be or include a logging-while-drilling (LWD) tool 212, a measurement-while-drilling (MWD) tool 214, and a drill bit 216. The LWD tool 212 may be configured to measure one or more formation properties and/or physical properties as the wellbore 204 is being drilled or at any time thereafter. The MWD tool 214 may be configured to measure one or more physical properties as the wellbore 204 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like.

Drilling fluid (also referred to as mud) 220 may be stored in a pit 222 at the surface 201. A pump 224 may deliver the drilling fluid 220 to the interior of the drill string 208, which causes the drilling fluid 220 to flow downwardly through the drill string 208 and into the downhole tool 210, as indicated by the directional arrow 226. The drilling fluid 220 may flow through the downhole tool 210 (e.g., through the LWD tool 212 and/or the MWD tool 214) and exit via ports in the drill bit 216. The drilling fluid 220 may then flow up through an annulus between the outside of the drill string 208 and a wall of the wellbore 204, as indicated by the directional arrows 228, where the drilling fluid may be filtered and/or reintroduced into the pit 222.

While in the wellbore 204, the downhole tool 210 may transmit the measurement data from the LWD tool 212 and the MWD tool 214 to a computing system 600 at the surface 201 using telemetry such as mud pulse telemetry or EM telemetry. More particularly, the measurement data from the LWD tool 212 may be transmitted to the MWD tool 214. The MWD tool 214 may then encode the measurement data from the LWD tool 212 and/or the MWD tool 214 using any suitable modulation method (e.g., pulse position modulation, continuous phase modulation, phase shift keying, frequency shift keying, quadrature amplitude modulation, orthogonal frequency division multiplexing, or the like).

The downhole tool 210 may have a plurality of telemetry modes. As used herein, the term "telemetry mode" refers to a pulse duration, a pulse rate, a bitrate, and/or a carrier frequency of the signal transmitted by the downhole tool 210. In one embodiment, each mode may correspond to a different pulse duration for transmitting the encoded data. For example, the downhole tool 210 may have six modes: 0.5 seconds, 0.6 seconds, 0.8 seconds, 1.0 second, 1.5 seconds, and 2.0 seconds. Thus, when in the fourth mode, the encoded data may be transmitted in discrete pulses, each having a duration of 1.0 second. When the encoded data is transmitted using mud pulse telemetry, the pulses may be pressure pulses that are introduced into the drilling fluid 220 by the downhole tool 210 (e.g., by the MWD tool 214). When the encoded data is transmitted using EM telemetry, the pulses may be EM pulses that are generated by the downhole tool 210 (e.g., by the MWD tool 214).

The pulses may be received by one or more sensors 230 at the surface 201, which may transmit the pulses (or the encoded data therein) to the computing system 600. As mentioned above, the computing system 600 may also have a plurality of telemetry modes. When the telemetry mode of the computing system 600 corresponds to the telemetry mode of the downhole tool 210 (e.g., pulses with a duration of 1.0 second), the computing system 600 may be able to decode the data transmitted by the downhole tool 210. However, when the telemetry mode of the computing system 600 does not correspond to the telemetry mode of the downhole tool 210 (e.g., because the mode of the downhole tool 210 has inadvertently changed), the computing system 600 may have difficulty decoding the data transmitted by the downhole tool 210.

Figure 3:
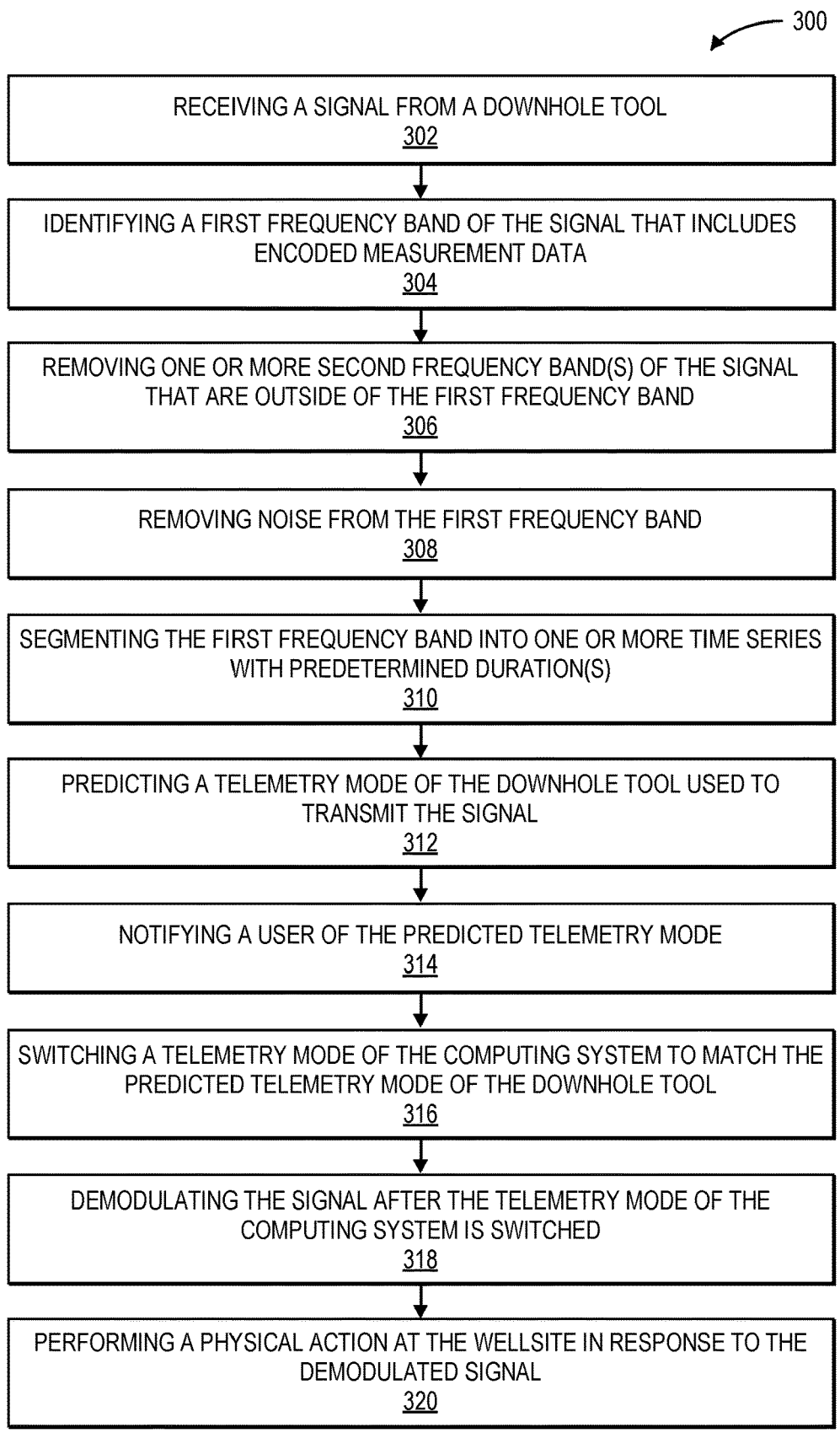
FIG. 3 illustrates a flowchart of a method for predicting a mode of the downhole tool, according to an embodiment.

FIG. 3 illustrates a flowchart of a method 300 for predicting the telemetry mode of the downhole tool 210, according to an embodiment. An illustrative order of the method 300 is provided below; however, as will be appreciated, one or more portions of the method 300 may be performed in a different order or omitted.

The method 300 may include receiving a signal from the downhole tool 210, as at 302. As mentioned above, the signal may be or include a mud pulse signal or an EM signal. The signal may be received by the sensor 230 and/or the computing system 600 at the surface 201. The signal may include data from the downhole tool 210. For example, the signal may include encoded measurement data from the LWD tool 212 and/or the MWD tool 214. In at least one embodiment, the telemetry mode of the downhole tool 210 may be unknown at the surface 201. As a result, the pulse duration of the signal, the pulse rate of the signal, the carrier frequency of the signal, the bitrate of the signal, or a combination thereof may be unknown to the computing system 600 or a user at the surface 201.

Figure 4A:
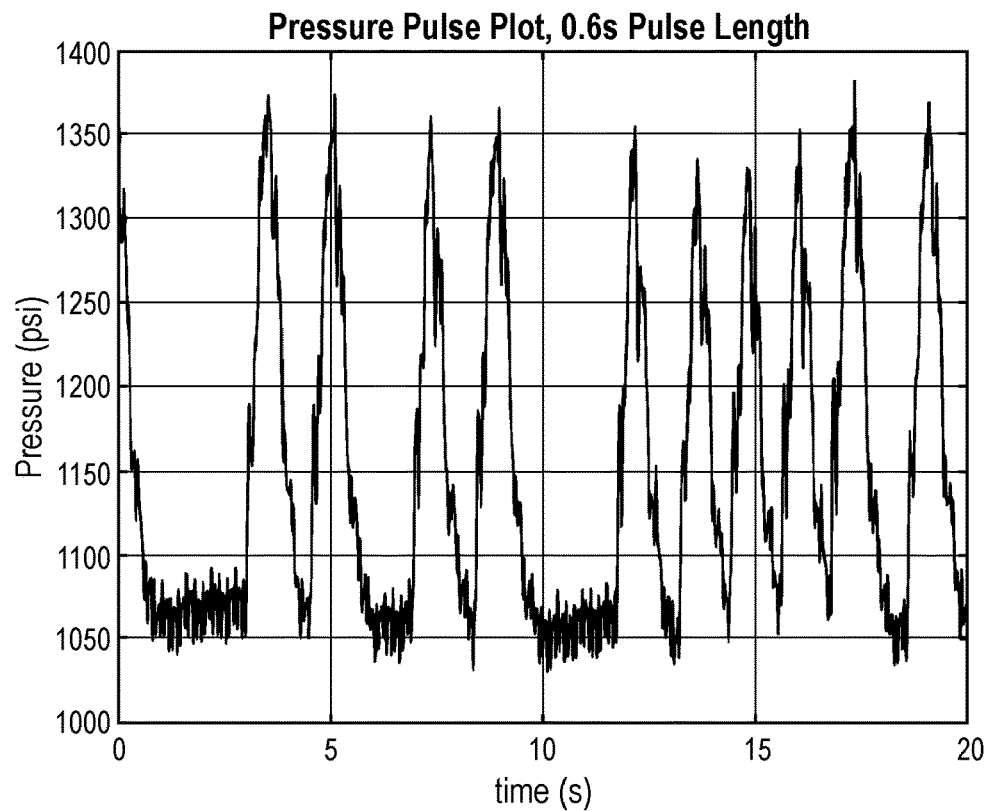
FIGS. 4A-4D illustrate examples of graphs including different unprocessed signals transmitted from the downhole tool, according to an embodiment. More particularly.
Figure 4B:
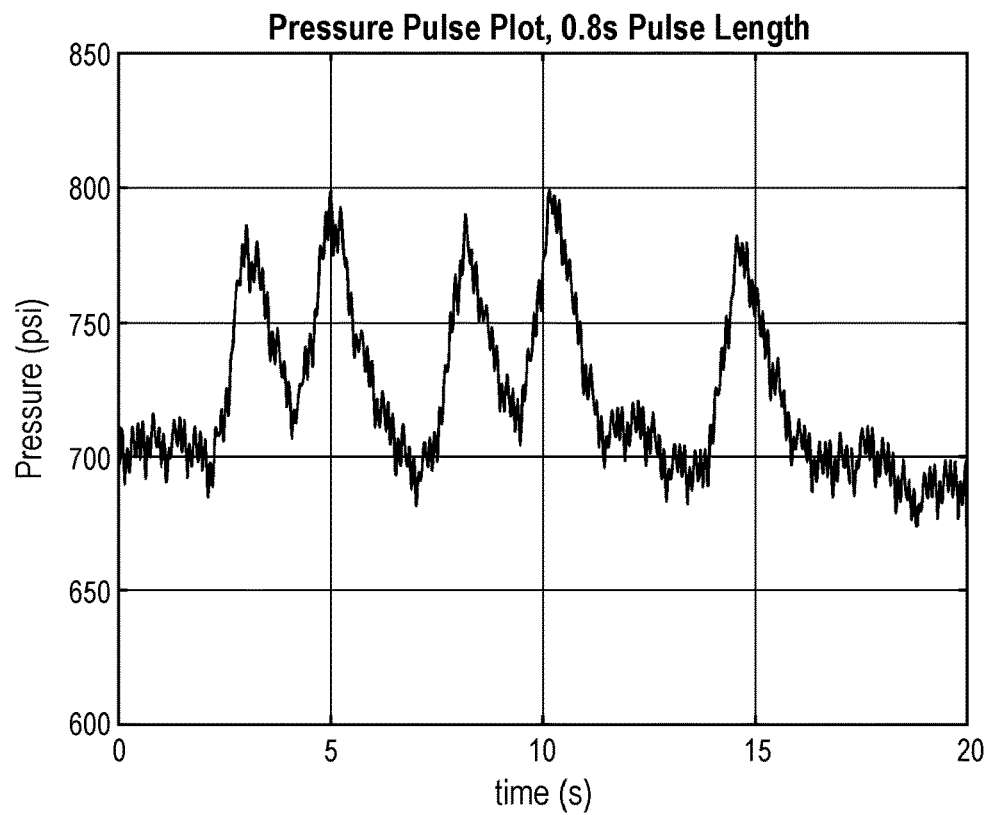
Figure 4C:
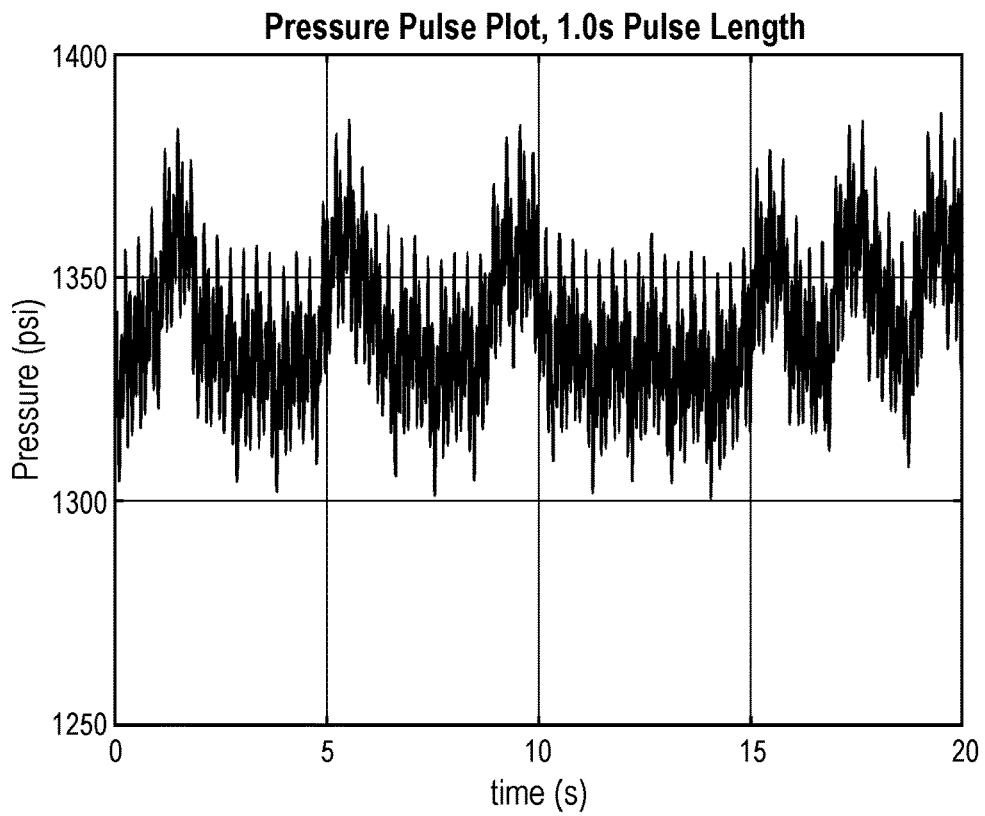
Figure 4D:
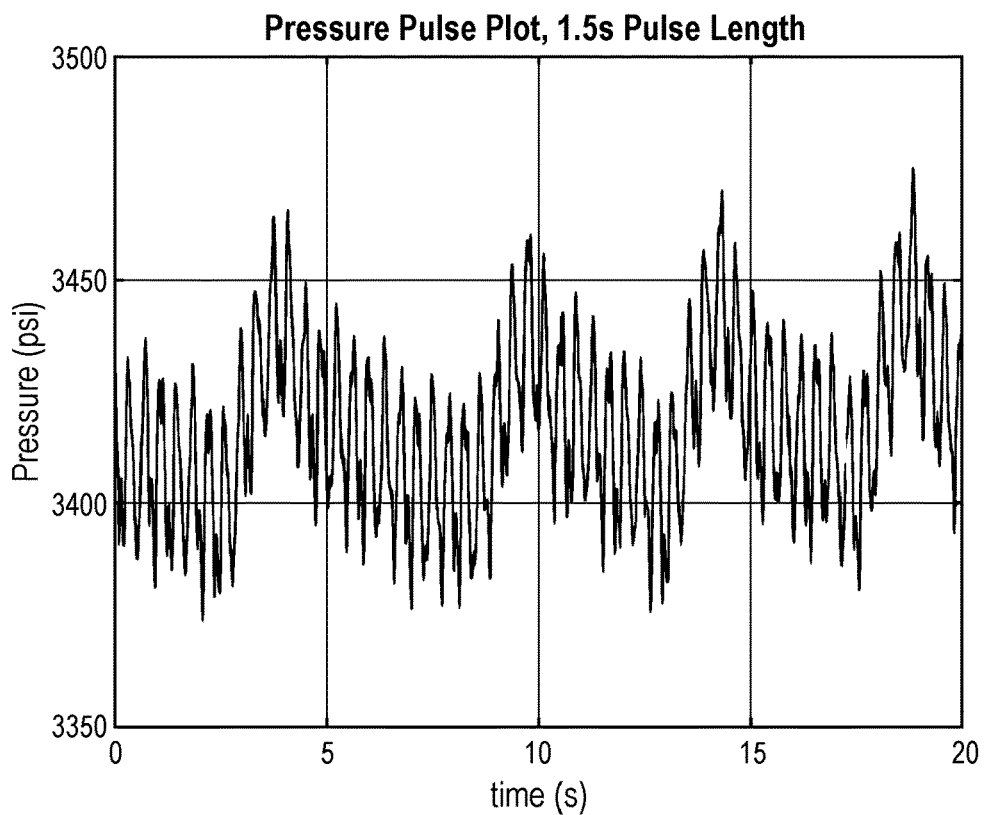

FIGS. 4A-4D illustrate examples of graphs including different unprocessed signals transmitted from the downhole tool 210. More particularly, FIG. 4A illustrates a graph 410 of pressure versus time for a signal having a pulse duration of 0.6 seconds. FIG. 4B illustrates a graph 420 of pressure versus time for a signal having a pulse duration of 0.8 seconds. FIG. 4C illustrates a graph 430 of pressure versus time for a signal having a pulse duration of 1.0 seconds. FIG. 4D illustrates a graph 440 of pressure versus time for a signal having a pulse duration of 1.5 seconds. The signals in the graphs 410, 420, 430, 440 are mud pulse telemetry signals, and the data has been encoded in the signals using pulse position modulation (PPM). When analyzing the graphs 410, 420, 430, 440, it may be difficult to determine the durations of the pressure pulses. Thus, when the telemetry mode of the downhole tool 210 is unknown, it may be difficult to predict the telemetry mode by analyzing the graphs 410, 420, 430, 440. As a result, it may be difficult to decode the signals.

The signal(s) may be processed, as described in 304, 306, 308, and/or 310 below. More particularly, the method 300 may include identifying a first frequency band of the signal that includes the data, as at 304. The first frequency band may include the encoded measurement data from the LWD tool 212 and/or the MWD tool 214. The first frequency band may be identified by the computing system 600 by modulation type. For example, when the modulation type is PPM, the data is encoded at baseband so a low-pass filter may be applied with a predetermined cutoff (e.g., 3 dB) at a predetermined frequency (e.g., 4 Hz).

The method 300 may also include removing one or more second frequency band(s) of the signal that are outside of the first frequency band, as at 306. In other words, the second frequency band(s) that do not include the data (e.g., the encoded measurement data) may be removed by the computing system 600.

The method 300 may also include removing noise from the first frequency band, as at 308. The computing system 600 may remove noise from the first frequency band that includes the data (e.g., the encoded measurement data). The noise may be generated by equipment around the wellsite 100, such as the pump 224.

The method 300 may also include segmenting the first frequency band of the signal into one or more time series with a predetermined duration, as at 310. The predetermined duration may be from about 1 second to about 3 seconds, about 2 seconds to about 5 seconds, about 3 seconds to about 10 seconds, about 5 seconds to about 30 seconds, or longer. As shown in FIGS. 4A-4D, the predetermined duration of the time series is 20 seconds.

Figure 5A:
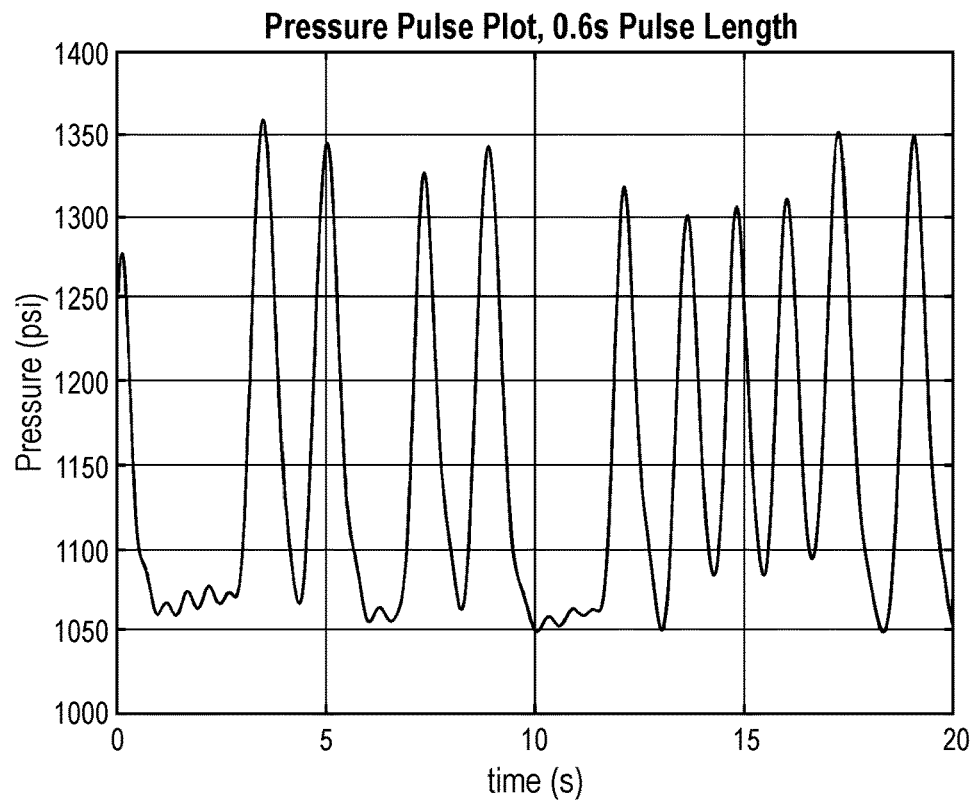
FIGS. 5A-5D illustrate examples of graphs including the signals in FIGS. 4A-4D, respectively, after being processed, according to an embodiment. More particularly.
Figure 5B:
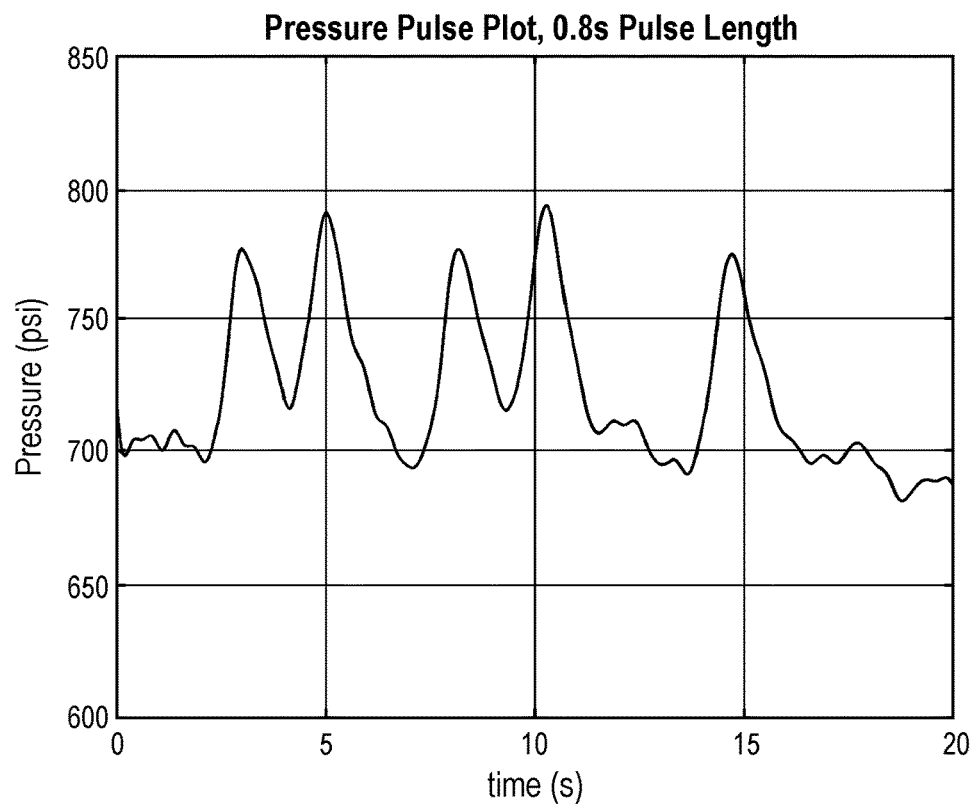
Figure 5C:
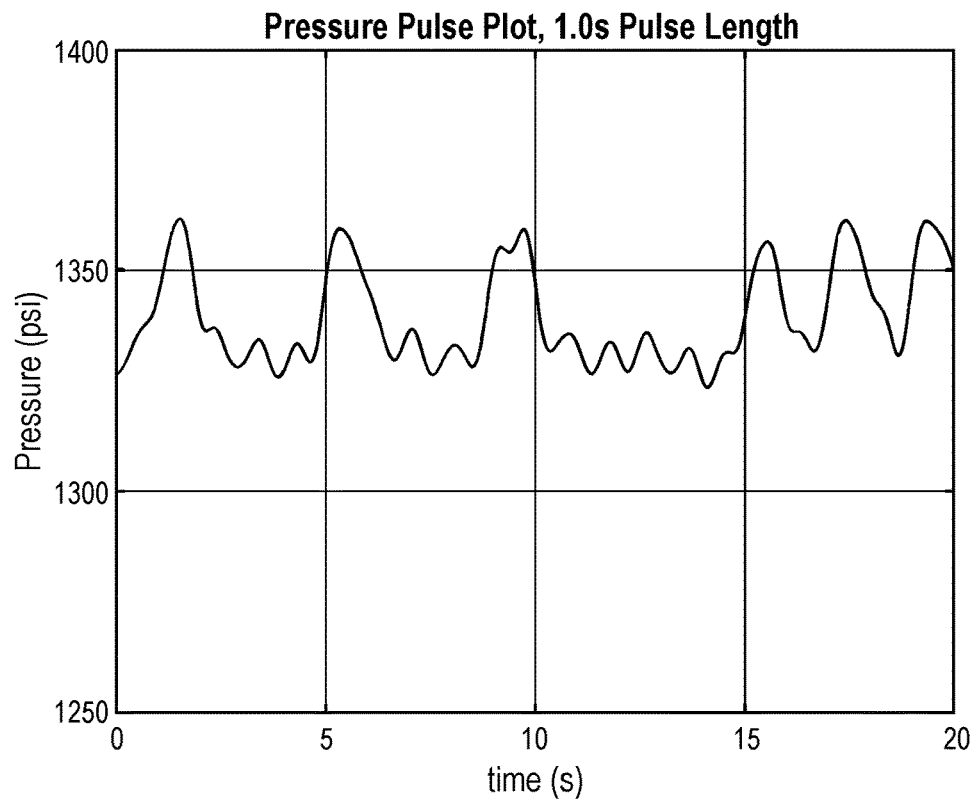
Figure 5D:
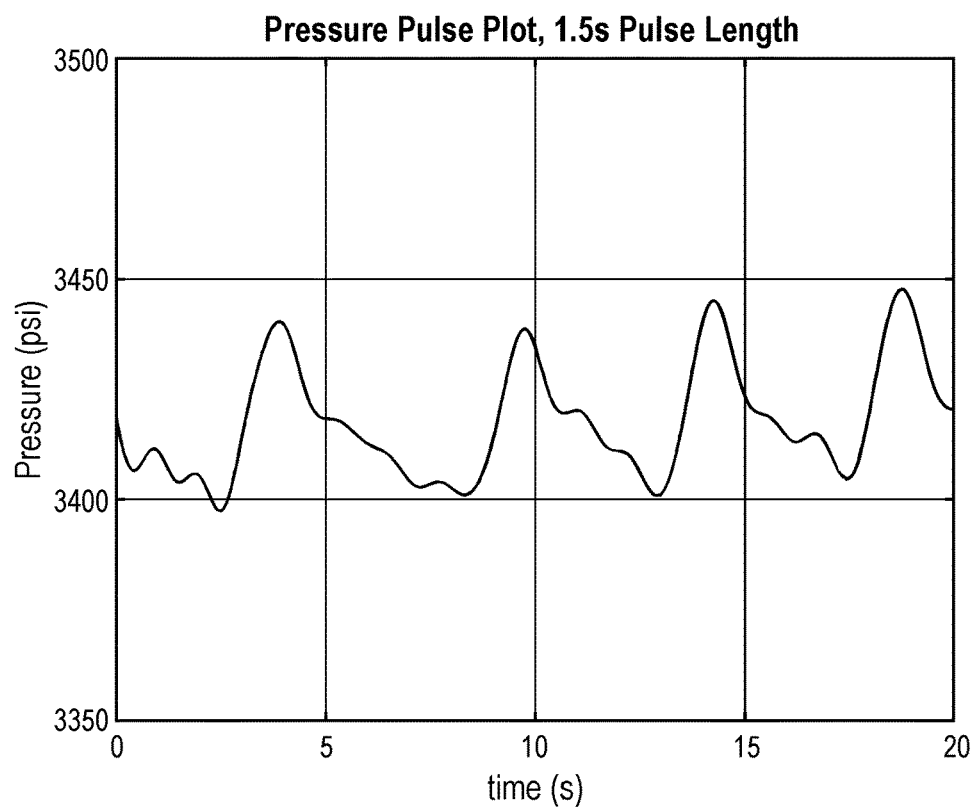

FIGS. 5A-5D illustrate examples of graphs including the signals in FIGS. 4A-4D, respectively, after being processed (e.g., at 304, 306, 308, and/or 310). More particularly, FIG. 5A illustrates a graph 510 of the signal in FIG. 4A (having a pulse duration of 0.6 seconds) after being processed. FIG. 5B illustrates a graph 520 of the signal in FIG. 4B (having a pulse duration of 0.8 seconds) after being processed. FIG. 5C illustrates a graph 530 of the signal in FIG. 4C (having a pulse duration of 1.0 seconds) after being processed. FIG. 5D illustrates a graph 540 of the signal in FIG. 4D (having a pulse duration of 1.5 seconds) after being processed.

Due to the processing (e.g., at 304, 306, 308, and/or 310), the graphs 510, 520, 530, 540 may have less distortion and be easier for the computing system 600 to analyze, as compared to the corresponding graphs 410, 420, 430, 440. However, the durations of the pulses at the surface may be/appear different than the durations of the pulses downhole. In the example of FIG. 5A, the downhole tool 210 may transmit the signal with pulse lengths of 0.6 seconds. However, FIG. 5A represents the signal as received at the surface (e.g., by the sensor 230 and/or the computing system 600), and as may be seen in FIG. 5A, the pulse duration(s) of the signal may be different (e.g., greater) than 0.6 seconds.

As discussed below, the computing system 600 may be able to analyze the signals received at the surface to predict the duration(s) of the pulses at the time they are transmitted from the downhole tool 600, and the processing (e.g., at 304, 306, 308, and/or 310) of the signal may increase the accuracy of this analysis.

The method 300 may also include predicting a telemetry mode of the downhole tool 210 used to transmit the signal (e.g., from the downhole tool 210 to the sensor 230 and/or the computing system 600), as at 312. The computing system 600 may analyze the processed signal using machine-learning (ML) techniques (e.g., neural networks, support vector machines, clustering, and/or brute-force) to predict the telemetry mode.

In an embodiment where the signals are encoded using PPM, the computing system 600 may use a neural network to predict the telemetry mode by comparing the processed signal from the downhole tool 210 (e.g., in graph 530) to a library of signals. The signals in the library may also be signals transmitted from the downhole tool 210 or other downhole tools. The signals in the library may have previously been analyzed (e.g., by field engineers) to determine the telemetry mode of those signals, such that the telemetry mode of the signals in the library is known. For example, the field engineers may determine the telemetry mode of each of the signals in the library based at least partially upon a particular pulse signature that the downhole tool 210 transmits immediately after turning on, analysis of the Fourier spectrum of the pressure signal, proper decoding of the signal, the pulse duration, the concentration of energy at a particular frequency/bandwidth, or a combination thereof. Based on the comparison, the computing system 600 may identify one or more signals in the library that are most similar to the signal from the downhole tool 210, and the computing system 600 may then predict that the telemetry mode of the signal from the downhole tool 210 is the same as the telemetry mode of the similar signal(s) in the library.

The computing system 600 may predict the telemetry mode of the signal from the downhole tool 210 by identifying a single mode (i.e., the downhole tool 210 is in mode 4 with a pulse duration of 1 second). However, in another embodiment, the computing system 600 may predict the telemetry mode of the signal from the downhole tool 210 by providing probabilities that the downhole tool 210 is in each of a plurality of modes (e.g., the six possible modes). An example of this is shown in Table 1 below.

TABLE 1

| Mode | 1 | 2 | 3 | 4 | 5 | 6 |
|---|---|---|---|---|---|---|
| Pulse Duration | 0.5 sec | 0.6 sec | 0.8 sec | 1.0 sec | 1.5 sec | 2.0 sec |
| Probability | 0% | 0% | 3% | 91% | 4% | 2% |

The method 300 may also include notifying a user of the predicted telemetry mode and/or the probability, as at 314.

The method 300 may also include switching a telemetry mode of the computing system 600 to match the predicted telemetry mode of the downhole tool 210, as at 316. As a result of the switching, the computing system 600 may now have the same mode as the downhole tool 210. In one example, the computing system 600 may automatically be switched to the predicted telemetry mode when the probability is greater than a predetermined threshold (e.g., 80%). In another embodiment, rather than switching the computing system 600 from a first telemetry mode to a second telemetry mode (e.g., the predicted telemetry mode), a second computing system 600 (or a second receiver within the first/existing computing system 600) may be launched that operates on the predicted telemetry mode. In yet another embodiment, the computing system 600 may be switched to run multiple modes in parallel.

The method 300 may also include demodulating the signal, as at 318. More particularly, a first portion of the signal received before the telemetry mode of the computing system 600 is switched may be demodulated and/or a second portion of the signal received after the telemetry mode of the computing system 600 is switched may be demodulated. The computing system 600 may demodulate the first and/or second portions of the signal received from the downhole tool 210 after the telemetry mode of the computing system 600 has been switched to match the telemetry mode of the downhole tool 210. Demodulating the signal may allow the computing system 600 to decode and recover the measurement data from the LWD tool 212 and/or the MWD tool 214.

In at least once the signal is demodulated, the recovered measurement data may be used to determine a confidence level (e.g., check or double-check) that the predicted telemetry mode is accurate. For example, the recovered measurement data may include the inclination of the wellbore 204 and/or the downhole tool 210. In this example, the operator may know that the downhole tool 210 is in a substantially vertical section of the wellbore 204 (e.g., having an inclination of about 90°). If the recovered measurement data indicates an inclination that is within a predetermined range (e.g., 90°+/−10°), this may increase the confidence level that the predicted telemetry mode is accurate. However, if the recovered measurement data indicates that the measured inclination outside of this predetermined range (e.g., the measured inclination is 10°), this may decrease the confidence level that the predicted telemetry mode is accurate. In fact, it may confirm that the predicted telemetry mode is inaccurate, and the method 300 may loop back to an earlier portion (e.g., 302). As will be appreciated, inclination is merely one illustrative type of data that may be used to determine the confidence level. Other types of data, which may be independently known to be within a predetermined range, may be or include temperature, pressure, and the like.

In response to the decoded data, the method 300 may include performing a physical action at the wellsite 100, as at 320. The physical action may include modifying a volumetric flow rate, a pressure, and/or a composition of the drilling fluid 114 being pumped into the wellbore 130. The physical action may also or instead include modifying a weight on the drill bit 216 (WOB). The physical action may also or instead include modifying a trajectory of the wellbore 130.

Figure 6:
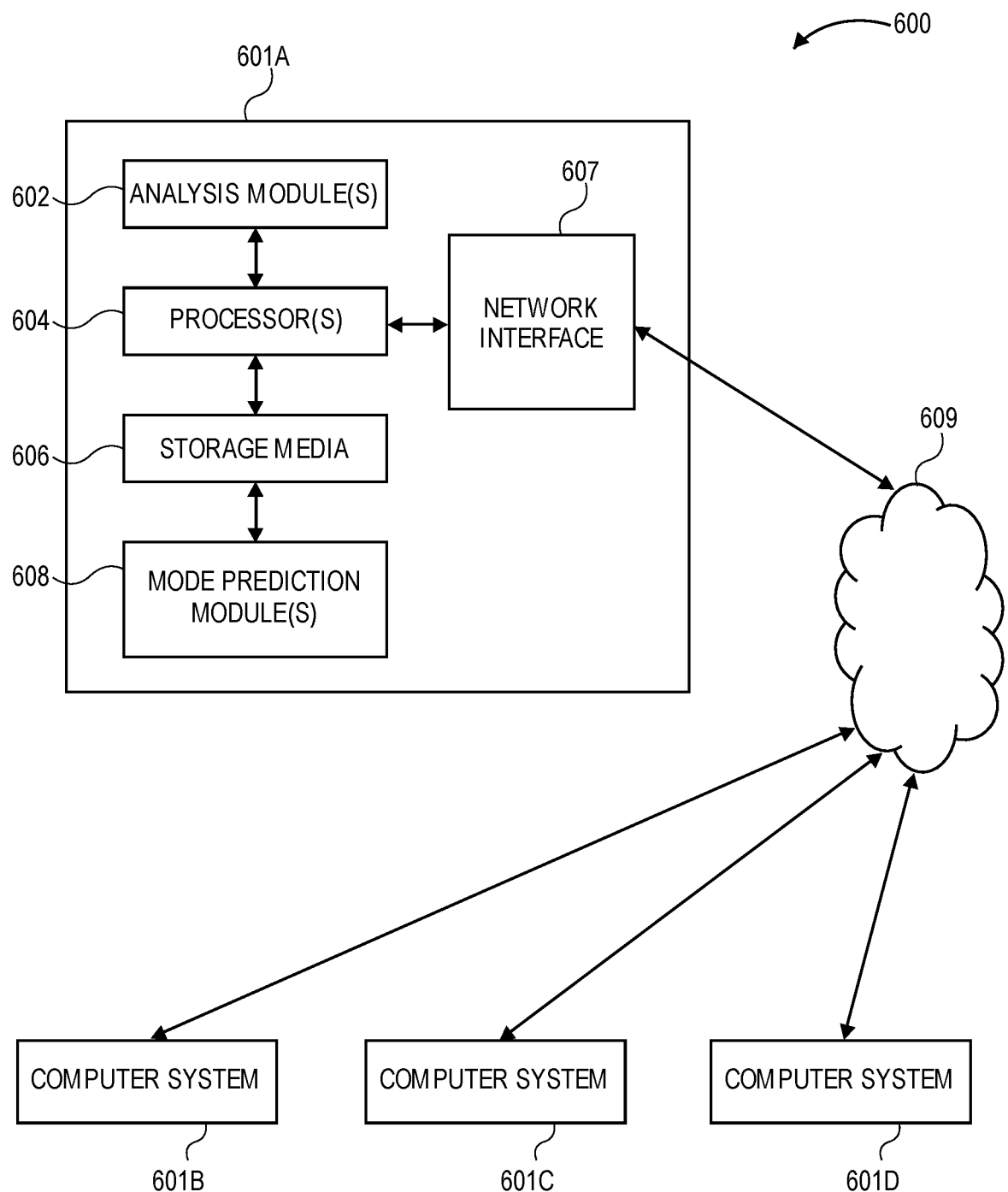
FIG. 6 illustrates an example of a computing system for performing at least a portion of the method(s) disclosed herein, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more mode prediction module(s) 608 that may perform at least a portion of the method 300 disclosed herein. It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for identifying a telemetry mode of a downhole tool, comprising:
   receiving a signal from the downhole tool at a computing system at a surface;
   identifying the telemetry mode of the downhole tool by comparing the signal to a plurality of signals in a library that have known telemetry modes;
   switching a telemetry mode of the computing system to match the telemetry mode of the downhole tool; and
   demodulating the signal using the computing system after the telemetry mode of the computing system has been switched.

2. The method of claim 1, wherein the telemetry mode of the downhole tool is unknown at a time that the signal is received.

3. The method of claim 1, wherein the signal comprises encoded measurement data captured by a measurement-while-drilling tool in the downhole tool, a logging-while-drilling tool in the downhole tool, or both, and wherein demodulating the signal decodes the encoded measurement data.

4. The method of claim 3, further comprising identifying a first frequency band of the signal by modulation type, wherein the first frequency band of the signal includes the encoded measurement data.

5. The method of claim 4, wherein identifying the first frequency band of the signal comprises applying a low-pass filter to the signal with a predetermined cutoff at a predetermined frequency when the modulation type comprises pulse position modulation.

6. The method of claim 4, further comprising removing one or more second frequency bands from the signal that are outside of the first frequency band.

7. The method of claim 5, further comprising:
   removing noise from the first frequency band of the signal; and
   segmenting the first frequency band of the signal into a time series having a predetermined duration.

8. The method of claim 1, wherein the signal is encoded by the downhole tool using pulse position modulation.

9. The method of claim 1, wherein identifying the telemetry mode comprises identifying probabilities of a plurality of different telemetry modes.

10. The method of claim 1, wherein the signal comprises a measured parameter, and wherein after the signal is demodulated, the method further comprises determining whether the measured parameter is within a predetermined range to confirm that the identified telemetry mode is accurate.

11. A method for identifying a telemetry mode of a downhole tool, comprising:
   receiving a signal from the downhole tool at a computing system at a surface, wherein the signal comprises encoded measurement data captured by a measurement-while-drilling tool in the downhole tool, a logging-while-drilling tool in the downhole tool, or both, and wherein the telemetry mode of the downhole tool is unknown at a time that the signal is received;
   identifying a first frequency band of the signal, wherein the first frequency band of the signal includes the encoded measurement data;
   applying a low-pass filter to the signal with a predetermined cutoff at a predetermined frequency to remove one or more second frequency bands of the signal that are outside of the first frequency band when a modulation type of the signal comprises pulse position modulation;
   comparing the first frequency band of the signal to a library of signals, wherein the signals in the library have known telemetry modes;
   identifying the telemetry mode of the downhole tool based upon the comparison;
   switching a telemetry mode of the computing system to match the telemetry mode of the downhole tool; and
   demodulating the signal using the computing system after the telemetry mode of the computing system has been switched.

12. The method of claim 11, wherein identifying the telemetry mode comprises identifying probabilities of a plurality of different telemetry modes of the downhole tool.

13. The method of claim 12, further comprising automatically switching the telemetry mode of the computing system in response to a probability of one of the different telemetry modes being greater than a predetermined threshold.

14. The method of claim 11, further comprising performing a physical action at a wellsite in response to demodulating the signal.

15. The method of claim 14, wherein performing the physical action is selected from the group consisting of:
   modifying a volumetric flow rate of a fluid being pumped into a wellbore;
   modifying a pressure of the fluid being pumped into the wellbore;
   modifying a composition of the fluid being pumped into the wellbore;
   modifying a weight on a drill bit in the wellbore; and
   modifying a trajectory of the wellbore.

16. A system, comprising:
   a downhole tool configured to:
      run into a wellbore;
      capture measurement data while positioned within the wellbore;
      encode the measurement data while positioned within the wellbore; and
      transmit a signal comprising the encoded measurement data while positioned within the wellbore; and
   a computing system positioned at a surface, wherein the computing system is configured to perform operations, the operations comprising:
      receiving the signal, wherein a telemetry mode of the downhole tool is unknown by the computing system at a time that the signal is received;
      identifying a first frequency band of the signal, wherein the first frequency band of the signal includes the encoded measurement data;
      applying a low-pass filter to the signal with a predetermined cutoff at a predetermined frequency to remove one or more second frequency bands of the signal that are outside of the first frequency band when a modulation type of the signal comprises pulse position modulation;
      comparing the first frequency band of the signal to a library of signals, wherein the signals in the library have known telemetry modes;
      identifying the telemetry mode of the downhole tool based upon the comparison;
      switching a telemetry mode of the computing system to match the telemetry mode of the downhole tool; and
      demodulating the signal after the telemetry mode of the computing system has been switched.

17. The system of claim 16, wherein identifying the telemetry mode comprises identifying probabilities of a plurality of different telemetry modes of the downhole tool.

18. The system of claim 17, wherein the operations further comprise automatically switching the telemetry mode of the computing system in response to a probability of one of the different telemetry modes being greater than a predetermined threshold.

19. The system of claim 16, wherein the operations further comprise causing a physical action to be performed at a wellsite in response to demodulating the signal.

20. The system of claim 19, wherein the physical action is selected from the group consisting of:
   modifying a volumetric flow rate of a fluid being pumped into the wellbore;
   modifying a pressure of the fluid being pumped into the wellbore;
   modifying a composition of the fluid being pumped into the wellbore;
   modifying a weight on a drill bit in the wellbore; and modifying a trajectory of the wellbore.

21. The method of claim 1, wherein identifying the telemetry mode of the downhole tool comprises estimating the most likely telemetry mode of the downhole tool.

22. The method of claim 1, wherein identifying the telemetry mode of the downhole tool further comprises:
   identifying one of the signals with known telemetry modes that is most similar to the signal from the downhole tool; and
   determining that the telemetry mode of the signal from the downhole tool is the same as the telemetry mode of the identified signal.

* * * * *